United States Patent [19]
Mayr et al.

[11] Patent Number: 4,637,502
[45] Date of Patent: Jan. 20, 1987

[54] OVERLOAD RELEASE MECHANISM FOR TORQUE COUPLINGS

[75] Inventors: Fritz Mayr, Mauerstetten; Manfred Dasser, Nesselwang, both of Fed. Rep. of Germany

[73] Assignee: Christian Mayr GmbH & Co. KG, Fed. Rep. of Germany

[21] Appl. No.: 693,898

[22] Filed: Jan. 23, 1985

[30] Foreign Application Priority Data

Jan. 27, 1984 [DE] Fed. Rep. of Germany ....... 3402860

[51] Int. Cl.$^4$ .............................................. F16D 43/20
[52] U.S. Cl. .................................. 192/56 R; 192/150; 464/36
[58] Field of Search ................. 192/56 R, 150, 110 R, 192/111 B, 98; 464/36, 38, 41, 43, 44; 384/272, 302, 271, 110

[56] References Cited

U.S. PATENT DOCUMENTS

| 141,986 | 8/1873 | Bird et al. ........................... 384/272 |
| 3,552,147 | 1/1971 | Johansson et al. ........... 192/56 R X |
| 3,659,911 | 5/1972 | Kessler et al. ...................... 384/110 |
| 3,762,240 | 10/1973 | Adams ............................ 384/272 X |
| 3,979,925 | 9/1976 | Kato ............................... 192/56 R X |
| 3,985,213 | 10/1976 | Braggins ........................... 192/56 R |

FOREIGN PATENT DOCUMENTS 2062799 5/1981 United Kingdom .................. 192/98

Primary Examiner—Rodney H. Bonck
Assistant Examiner—David A. Testardi
Attorney, Agent, or Firm—Spencer T. Smith

[57] ABSTRACT

An overload release mechanism comprising a control plunger, a housing for slidably supporting the control plunger for axial displacement from an advanced coupling position to a retracted release position, the control plunger having a first portion having a first diameter, a second portion having a second smaller diameter and an inclined annular surface joining the first and second portions. The control plunger is maintained at the advanced coupling position until a predetermined axial force is applied and then is axially displaced to the retracted release position by a control ring having an inner diameter substantially the same as the second control plunger diameter made up of a plurality of discrete individual circumferential segments forming a substantially continuous ring when extending around the second control plunger portion. The control ring has a first inclined surface for matingly engaging with the inclined annular control plunger surface when the control plunger is at the advanced coupling position. A pressure ring and the housing include annular surfaces which are tapered towards each other outwardly in the radial direction and the control ring has a second annular surface for matingly engaging with the pressure ring surface, and a third annular surface for matingly engaging with the housing annular surface. A spring urges the pressure ring inclined surface against the second annular control ring surface to forcefully locate the control ring against the inclined annular control plunger surface.

5 Claims, 4 Drawing Figures

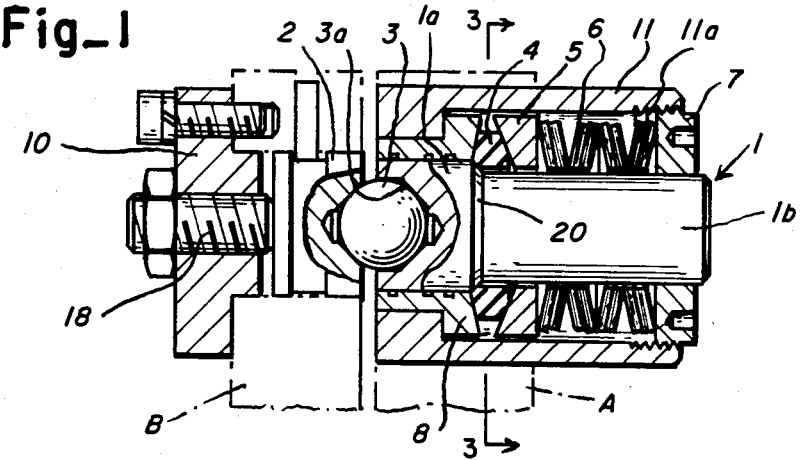
Fig_1
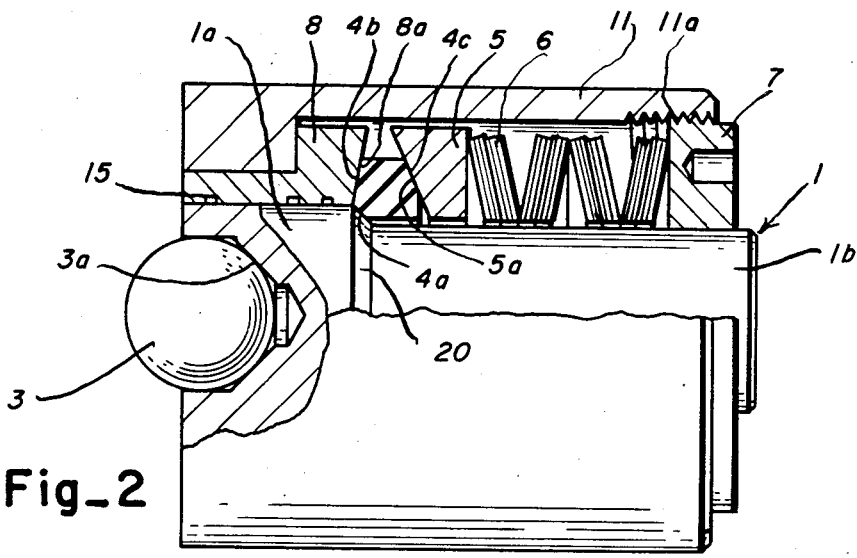
Fig_2
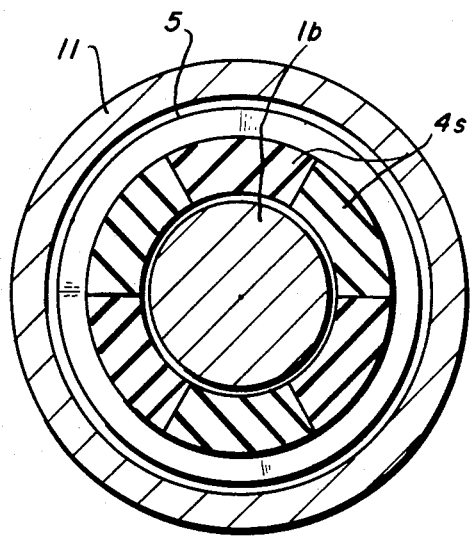
Fig_3
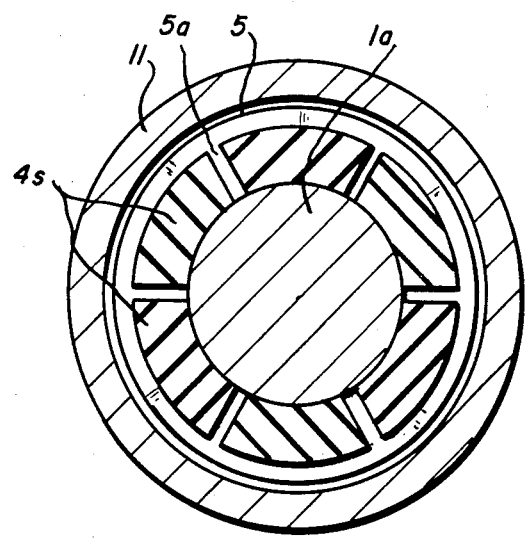
Fig_4

OVERLOAD RELEASE MECHANISM FOR TORQUE COUPLINGS

The invention relates to an overload release mechanism for limiting the torque to be transmitted between two coupling members. Overload release devices such as disclosed in U.S. Pat. No. 3,985,213 operate on the principle of a ball being mounted between two structural components and being retained by spring pressure to couple the two structural components and thereby transmit torque from one of these components to the other. As soon as the torque exceeds a value determined by the spring bias, the ball will be forced to leave its seat in one of the components and be displaced to a retracted position in the other component uncoupling the two structural components. The spring bias in this prior art structure is transmitted by a ring of balls distributed around the periphery of a control plunger and acts on an inclined shoulder of the latter to transmit the spring bias to the plunger, and thus, to the ball which is rotatably secured to the end of the plunger.

Such overload release mechanisms utilizing a ring of balls are subject to limitations relative to the torque to be transmitted since the force will be transmitted from the balls to the inclined shoulder at points of contact. The maximum permissible contact pressure may, accordingly, be exceeded by relatively low forces causing the inclined shoulder and/or the ball elements to experience permanent deformation.

It is, accordingly, an object of the present invention to improve on such prior art overload release mechanisms so that they may be set to release at higher torque limits while maintaining the same external dimensions as the prior art mechanisms. This object may be achieved in a surprisingly simple manner. Instead of the prior ring of balls, the invention uses a segmented control ring having a polygonal cross section with the pressure-transmitting surfaces of the control ring mating with corresponding surfaces of the overload release element. In this way, the surface area available for force transmission is substantially increased. Point contact is eliminated and replaced by line or planar contact.

The inclined annular plunger shoulder is located near the coupling end so that axially acting belleville washers can be compressively located between the control ring and an adjustment nut which is threaded into the housing at the outwardly projecting end of the overload release element. The control ring will be biased on the side remote from the coupling end so that adjustment of the spring can be effected, advantageously simply by adjusting the accessible adjustment nut. In stark contrast, the overload release mechanism of U.S. Pat. No. 3,985,213 requires two steps of adjustment, and these two steps must be performed in a precise and correlated manner.

An advantage of the present invention is that the overload release mechanism can be more compact in construction than heretofore possible and utilizes simplified means for adjusting the overload release device.

Other objects and advantages of the present invention will become apparent from the following portion of this specification and from the following drawings which illustrate, in accordance with the mandate of the patent statutes, a presently preferred embodiment incorporating the principles of the invention.

Referring to the drawings

FIG. 1 is an elevational view, partly in section, illustrating the overload release mechanism made in accordance with the teachings of the present invention;

FIG. 2 is an enlarged showing of a portion of the overload release mechanism illustrated in FIG. 1, FIG. 3 is a view of the overload release mechanism illustrated in FIGS. 1 and 2 taken along lines 3—3 thereof, and FIG. 4 is a view similar to FIG. 3 with the control plunger in the retracted or release position.

The overload release mechanism comprises a central member in the form of a pressure pin or control plunger 1 having two different diameter portions connected by an inclined peripheral shoulder 20. Major diameter end (the first portion) 1a of plunger 1 has an axially extending recess 3a for receiving a ball 3. The ball 3 is contained within, but may rotate freely in this recess. In the coupled condition of the overload release mechanism, as shown in FIG. 1, a control ring 4 which has approximately the same inner diameter as the diameter of the second control plunger portion extends around the minor diameter portion 1b of the control plunger. The control ring 4 has a polygonal cross section and has a first inclined annular surface 4a which is approximately the same length as and matingly engages with the inclined annular shoulder 20 of the control plunger 1. A second inclined annular surface 4b of the control ring matingly engages with an inclined annular surface 8a of the supporting bushing 8 which is seated in the housing 11 of the overload release mechanism. The opposite inclined surface 4c of the control ring 4 matingly engages with an inclined surface 5a of a pressure ring 5. The control surfaces 5a, 8a of the pressure ring 5 and support bushing 8 are tapered towards each other in the outward radial direction (In the disclosed embodiment, both surfaces are inclined). Pressure ring 5 is biased in the axial direction by belleville washers 6 placed around the minor diameter portion 1b of the plunger 1 and compressively contained between an adjustment nut 7 threaded into a threaded housing bore 11a and the pressure ring 5 and forces the control ring towards the coupling end of the mechanism. The degree of spring bias is accordingly adjustable.

The control ring 4 is divided circumferentially into a plurality of individual discrete segments 4s (FIG. 3), which when they are located around the minor diameter portion of the control plunger 1, substantially contact each other so as to form a substantially continuous ring. When the plunger 1 is forcefully displaced to the right against the bias of the belleville washers 6 to its release or retracted position (FIG. 4), the inclined shoulder portion 20 will cam the segments of the control ring 4 to a second, radial location (shown in phantom in FIG. 3) where they will extend around and substantially matingly engage with the major diameter 1a of the control plunger. Circumferential spacings will exist between the segments at this second radial position.

In a traditional application, at least two overload release mechanisms will be provided at diametrically opposed locations in two concentric coupling flanges A and B. In the coupled condition, torque is transmitted due to the lock between plunger 1, ball 3 and the correspondingly shaped ball seat or pressure element 2 in the second coupling flange B. In the event of overload, the plunger 1 will be forcefully displaced to its retracted or release position and flanges A and B will rotate relative to each other.

In order to reach the disengaged or retracted position, control segments 4 moved radially outwardly across the inclined shoulder 20 to engage the major diameter portion 1a of plunger 1. As a result, the axial forces generated by the belleville washers 6 cannot act on the plunger to displace it axially and plunger 1, as well as ball 3, will then be retained in this disengaged position until the coupling is reengaged by turning flanges A and B until they have reached the proper relative position in which plunger 1 and pressure element 2 are in precise alignment and the control plunger is pushed to its advanced or coupling position. The flow of force will be from the belleville washers to pressure ring 5, control ring 4 and supporting bushing 8 to housing 11, which mounts the adjustment nut 7 for the belleville washers. The axial force exerted by the belleville washers against retraction of ball 3 will again be transmitted by pressure ring 5 through segment ring 4 to the inclined shoulder, which in turn acts on ball 3. As may be seen, the maximum torque to be transmitted by ball 3 may be varied by changing the setting of adjusting nut 7. Outward movement of plunger 1 (to the lefthand side of the drawing) is limited in the non-assembled condition (FIG. 2) by control segments 4 axially abutting supporting bushing 8. A bolt 18 threaded into a counterplate 10 in coupling flange B may be used to adjust pressure member 2 until it engages ball 3 without clearance.

In the engaged position shown in the drawing, the control segments form a substantially continuous ring, with planes of separation being provided which extend in radial directions so that the individual segments of the ring may move to the major diameter portion 1a of the plunger as the overload release mechanism disengages. Preferably, the planes of separation lie in different radial planes of the ring. In the embodiment shown in the drawings, the surface of control segments 4 which engages pressure ring 5 has an angle of 65° relative to the axis of rotation, whereas the surface of control segments 4 which engages supporting busing 8 extends at an angle of 110° to the axis of rotation of the overload release mechanism. The inclined shoulder 20 has an angle of about 45° to the axis of rotation.

In general, the number of control segments 4s comprising the segmented ring is unimportant. However, it is evident that pressure conditions will improve with the number of such control segments 4. In the disclosed embodiment, the control ring is divided into six identical control segments.

For long-term lubrication of the overload release mechanism, a suitable grease may be provided in the regions shown at 15.

What is claimed is:

1. An overload release mechanism comprising
    a control plunger,
    a housing for slidably supporting said control plunger for axial displacement from an advanced coupling position to a retracted release position,
    said control plunger having a first portion having a first diameter, a second portion having a second smaller diameter and an inclined annular surface joining said first and second portions,
    means for maintaining said control plunger at said advanced coupling position until a predetermined axial force is applied and then permitting axial displacement of said control plunger to said retracted release position including
        a control ring having an inner diameter substantially the same as said second control plunger diameter,
        said control ring comprising a plurality of discrete individual circumferential segments forming a substantially continuous ring when extending round said second control plunger portion,
        said control ring having a first inclined surface for matingly engaging and substantially coextensive with said inclined annular control plunger surface when said control plunger is at said advanced coupling position,
        a pressure ring,
        said housing and said pressure ring each including an annular surface, said annular surfaces being tapered towards each other outwardly in the radial direction,
        said control ring having a second annular surface for matinly engaging with said pressure ring surface, and a third annular surface for matingly engaging with said housing annular surface, and
        spring means for urging said pressure ring inclined surface in a direction opposite to the direction of movement of said control plunger to said retracted position against said second annular control ring surface to forcefully locate said control ring against said inclined annular control plunger surface.

2. An overload release mechanism according to claim 1, wherein said annular pressure ring surface is inclined.

3. An overload release mechanism according to claim 2, wherein said housing annular surface is inclined.

4. An overload release mechanism according to claim 3, wherein
    said pressure ring annular inclined surface is inclined in the same direction as said control plunger annular surface,
    said housing includes an adjustment nut including a central bore for slidably supporting the end of said second control plunger portion, and
    said spring means is compressively located between said pressure ring and said adjustment nut.

5. An overload release mechanism according to claim 1, wherein said control ring has six segments.

* * * * *